United States Patent
Shi et al.

(10) Patent No.: US 9,859,800 B2
(45) Date of Patent: Jan. 2, 2018

(54) CIRCUIT STRUCTURE AND METHOD FOR REDUCING POWER CONSUMPTION OF DEVICE INCLUDING ACTIVE MODULE AND PASSIVE MODULE

(71) Applicant: ABB Schweiz AG, Bad (CH)

(72) Inventors: Huan Shi, Hangzhou (CN); Axel Lohbeck, Hangzhou (CN)

(73) Assignee: ABB Schweiz AG (CH)

( * ) Notice: Subject to any disclaimer, the term of this patent is extended or adjusted under 35 U.S.C. 154(b) by 87 days.

(21) Appl. No.: 14/441,884

(22) PCT Filed: Nov. 15, 2012

(86) PCT No.: PCT/CN2012/084690
§ 371 (c)(1),
(2) Date: May 11, 2015

(87) PCT Pub. No.: WO2014/075275
PCT Pub. Date: May 22, 2014

(65) Prior Publication Data
US 2015/0340958 A1 Nov. 26, 2015

(51) Int. Cl.
*H02J 1/10* (2006.01)
*H02M 3/335* (2006.01)
(Continued)

(52) U.S. Cl.
CPC .......... *H02M 3/33546* (2013.01); *G05F 1/00* (2013.01); *G05F 1/46* (2013.01); *G05F 1/56* (2013.01);
(Continued)

(58) Field of Classification Search
CPC ......... H02M 3/1584; H02M 2001/0006; H02J 9/061; G06F 1/3206; G05F 1/00; G05F 1/56
(Continued)

(56) References Cited

U.S. PATENT DOCUMENTS 4,812,672 A 3/1989 Cowan et al.
5,796,274 A 8/1998 Willis et al.
(Continued)

FOREIGN PATENT DOCUMENTS

CN 1983761 A 6/2007
CN 101394097 A 3/2009
(Continued)

OTHER PUBLICATIONS

ISA/CN International Search Report issued Aug. 15, 2013 re PCT Application No. PCT/CN2012/084690, filed Nov. 15, 2012.
(Continued)

*Primary Examiner* — Jared Fureman
*Assistant Examiner* — Duc M Pham
(74) *Attorney, Agent, or Firm* — Taft, Stettinius & Hollister LLP

(57) ABSTRACT

Embodiments of the present invention disclose a circuit structure and a method for reducing power consumption of a device including an active module and a passive module. The circuit structure comprises: an active module (22) comprising a main output voltage (221) for powering a load (26) via a first current control device (222) which is configured to control a current passing through the load (26), and an passive module (24) comprising a main output voltage (241) for when the active module (22) fails, powering the load (26) via a second current control device (242) which is configured to control a current passing through the load (26). The passive module (24) further comprises an auxiliary output voltage (243) for when the passive module (24) is in a backup state, powering the second current control device (242) so as to enable the second current control device (242) to be in a switching-on state. Further, the auxiliary output voltage (243) of the passive module (24) is configured to be smaller than the main output voltage (241) of the passive module (24).

24 Claims, 3 Drawing Sheets

(51) Int. Cl.
*H02M 3/158* (2006.01)
*G05F 1/00* (2006.01)
*G05F 1/46* (2006.01)
*G05F 1/56* (2006.01)
*G06F 1/30* (2006.01)
*G06F 1/32* (2006.01)
*H02M 3/337* (2006.01)
*H02J 9/06* (2006.01)
*H02M 1/00* (2006.01)
*H02M 1/32* (2007.01)

(52) U.S. Cl.
CPC .............. *G06F 1/30* (2013.01); *G06F 1/3206* (2013.01); *H02M 3/1584* (2013.01); *H02J 9/061* (2013.01); *H02M 3/3376* (2013.01); *H02M 2001/0006* (2013.01); *H02M 2001/325* (2013.01)

(58) Field of Classification Search
USPC ........................................................... 307/43
See application file for complete search history.

(56) References Cited

U.S. PATENT DOCUMENTS

| | | | | |
|---|---|---|---|---|
| 2003/0231003 A1* | 12/2003 | Ballard | ................. | H02J 7/0072 320/116 |
| 2004/0145348 A1* | 7/2004 | Bucur | ................... | H02J 7/0018 320/128 |
| 2005/0099750 A1* | 5/2005 | Takahashi | ............... | H02J 9/061 361/92 |
| 2010/0066431 A1* | 3/2010 | Carter | ....................... | H02J 1/10 327/408 |
| 2012/0026992 A1 | 2/2012 | Navda et al. | | |
| 2012/0292999 A1 | 11/2012 | Henkel et al. | | |
| 2013/0020872 A1* | 1/2013 | Kinnard | .................. | H02J 9/061 307/64 |
| 2013/0076143 A1* | 3/2013 | Guo | ......................... | H02J 9/04 307/66 |
| 2013/0275777 A1* | 10/2013 | Shih | ......................... | G06F 1/30 713/300 |

FOREIGN PATENT DOCUMENTS

| | | |
|---|---|---|
| WO | 2011085980 A2 | 7/2011 |
| WO | 2012086001 A2 | 6/2012 |

OTHER PUBLICATIONS

Communication pursuant to Rule 71(3) EPC Issued by the European Patent Office, Nov. 4, 2016, 27 pages.
Extended European Search Report of European Patent Application No. 12888486.3, issued by the European Patent Office, Jun. 23, 2016, 5 pages.
First Office Action of Chinese Patent Application No. 2012800770566, issued by the State intellectual Property Office, Aug. 3, 2016, 11 pages including Machine Translation in English.

* cited by examiner

CIRCUIT STRUCTURE AND METHOD FOR REDUCING POWER CONSUMPTION OF DEVICE INCLUDING ACTIVE MODULE AND PASSIVE MODULE

TECHNICAL FIELD

Embodiments of the present invention relate to the field of power electronics, and more particularly, relate to a circuit structure and a method for reducing power consumption of a device including an active module and a passive module.

BACKGROUND ART

Redundancy is widely used in various process controls which need a higher reliability. Input/output (I/O) redundancy in a discrete controlling system (DCS) provides two modules with identical hardware and firmware structures, namely, one is an active module, and the other is a passive or backup module. As soon as an error is happened in the active module, a switchover from the active module to the passive module will be initiated. Then, an active module will stop working, and the passive module will take over the responsibility to keep the process control running. Redundancy design in the I/O module increases the reliability of the DCS and make sure that an error in the I/O module will not affect the process control.

There are two prior art solutions for analog output module redundancy. First is so called parallel redundancy. In this solution, both the active and passive modules output 50% of the power respectively and work in parallel. However, the parallel redundancy requires a high reliability in module synchronization as well as accuracy of each single module. Therefore, the parallel redundancy is not only difficult to implement, but also its manufacturing cost will be relatively higher.

Another prior art solution is to make the active module to output 100% of the power and the passive module to only establish an output circle inside the pass module itself. This solution is simpler and the cost is lower. In this solution, since the output circle is already established inside the passive module, the switchover is also bumpless. However, an output current inside the passive module also increases power consumption of the passive module. And power consumption of the redundant passive module might be a big problem for system power dissipation and also not good for minimizing a size of the module.

FIG. 1 schematically illustrates a redundant circuit structure according to the prior art. As shown in FIG. 1, the circuit structure comprises an active module 12 and a passive module 14. In a normal situation, a first switch 122 in the active module is opened, an output voltage 124 in the active module 12 powers a load 16 via a current control device 126, for example, a Metal-Oxide-Semiconductor Field Effect Transistor (MOSFET). Meantime, a second switch 142 in the passive module 14 is closed to make sure the passive module 14 do not power the load 16. In other words, in the normal situation, the active module 12 provides a power to the load 16, and the passive module 14 is in a backup state. In a case that an error is happened in the active module 12, a switchover from the active module 12 to the passive module 14 will be initiated. In this time, the first switch 122 is closed, and the second switch 142 in the passive module 14 is opened. Thus, the voltage output 144 of the passive module 14 powers the load 16 via a current control device 146, for example, MOSFET. However, this solution makes the power consumption of the passive module quite high because the higher voltage output 144 is still applied to the second current control device (MOSFET) 146 even though the passive module 14 is in the backup state, and therefore not good for heat dissipation.

SUMMARY OF INVENTION

In view of the foregoing, one or more of the objectives of embodiments of the present invention is to propose a circuit structure and method to solve or at least partially mitigate at least a part of problems in the prior art.

According to a first aspect of embodiments of the present invention, there is provided a circuit structure. The circuit structure comprises an active module and a passive module. The active module comprises a main output voltage for powering a load via a first current control device which is configured to control a current passing through the load. The passive module comprises a main output voltage for when the active module fails, powering the load via a second current control device which is configured to control a current passing through the load. The passive module further comprises an auxiliary output voltage for when the passive module is in a backup state, powering the second current control device so as to enable the second current control device to be in a switching-on state. Further, the auxiliary output voltage of the passive module is configured to be smaller than the main output voltage of the passive module.

According to an exemplary embodiment, the auxiliary output voltage of the passive module can be further configured to provide the second current control device with a voltage greater than or equal to a voltage for enabling the second current control device to be in its saturation region.

According to an exemplary embodiment, the active module can further comprise an auxiliary output voltage for powering the first current control device when the active module is in a backup state, to enable the first current control device to be in a switching-on state. In this embodiment, the auxiliary output voltage of the active module can be configured to be smaller than the main output voltage of the active module.

According to an exemplary embodiment, the auxiliary output voltage of the active module can be further configured to be greater than or equal to a voltage for enabling the first current control device to be in its saturation region.

According to an exemplary embodiment, the active module can further comprise a first switch between the main output voltage of the active module and the load and a second switch between the first current control device and the auxiliary output voltage of the active module. In this embodiment, the first switch and the second switch are interlocked.

According to an exemplary embodiment, the passive module can further comprise a third switch between the main output voltage of the passive module and the load and a fourth switch between the second current control device and the auxiliary output voltage of the passive module. In this embodiment, the third switch and the fourth switch are interlocked.

According to an exemplary embodiment, the first switch and the third switch are interlocked.

According to an exemplary embodiment, the active module can further comprise a first driving unit connected to a control terminal of the first current control circuit, for providing a first control signal for periodically switching on and switching off the first current control circuit. The passive module can further comprise a second driving unit connected to a control terminal of the second current control circuit, for providing a second control signal for periodically switching on and switching off the second current control circuit. The control signal may be PWM or similar signal.

According to an exemplary embodiment, the first control signal is same as the second control signal.

According to an exemplary embodiment, the first current control device and the second current control device can be MOSFETs.

According to an exemplary embodiment, the circuit structure can further comprise a first planar transformer for generating the main output voltage and the auxiliary output voltage of the active module.

According to an exemplary embodiment, the circuit structure can further comprise a second planar transformer for generating the main output voltage and the auxiliary output voltage of the passive module.

According to a further aspect of embodiments of the present invention, there is a circuit structure switchable between an operating state and a backup state. The circuit structure comprises a main output voltage for powering a load via a current control device which is configured to control a current passing through the load when the circuit structure is in the operating state; and an auxiliary output voltage for when the circuit structure is in the backup state, powering the current control device so as to enable the current control device to be in the switching-on state. Further, the auxiliary output voltage is configured to be smaller than the main output voltage.

According to an exemplary embodiment, the auxiliary output voltage can be further configured to provide the current control device with a voltage greater than or equal to a voltage for enabling the second current control device to be in its saturation region.

According to an exemplary embodiment, the circuit structure can further comprise a first switch between the main output voltage and the load and a second switch between the current control device and the auxiliary output voltage. In this embodiment, the first switch and the second switch are interlocked.

According to an exemplary embodiment, the current control device can be a MOSFET.

According to a further aspect of embodiments of the present invention, there is provided a method for reducing power consumption of a device including an active module and a passive module. The method comprises: powering a load via a first current control device by a main output voltage of the active module, wherein the first current control device controls a current passing through the load; when the active module fails, powering the load via a second current control device by a main output voltage of the passive module, wherein the second current control device controls a current passing through the load; and when the passive module is in a backup state, powering the second current control device by an auxiliary output voltage of the passive module so as to enable the second current control device to be in a switching-on state. Further, the auxiliary output voltage of the passive module is smaller than the main output voltage of the passive module.

According to an exemplary embodiment, the auxiliary output voltage of the passive module provides the second current control device with a voltage greater than or equal to a voltage for enabling the second current control device to be in its saturation region.

According to an exemplary embodiment, the method can further comprise: when the active module is in a backup state, powering the first current control device by an auxiliary output voltage of the active module, so as to enable the first current control device to be in a switching-on state. In this embodiment, the auxiliary output voltage of the active module is smaller than the main output voltage of the active module.

According to an exemplary embodiment, the auxiliary output voltage of the active module is greater than or equal to a voltage for enabling the first current control device to be in its saturation region.

According to an exemplary embodiment, the active module can comprise a first switch between the main output voltage of the active module and the load and a second switch between the first current control device and the auxiliary output voltage of the active module. In this embodiment, the first switch and the second switch are interlocked.

According to an exemplary embodiment, the passive module can comprise a third switch between the main output voltage of the passive module and the load and a fourth switch between the second current control device and the auxiliary output voltage of the passive module. In this embodiment, the third switch and the fourth switch are interlocked.

According to an exemplary embodiment, the first switch and the third switch are interlocked.

According to an exemplary embodiment, the first current control device and the second current control device can be MOSFETs.

Compared with the prior art solution, the circuit structures and methods as provided in the embodiments of the present invention have much lower power consumption of the active module and the passive module and good for heat dissipation.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF DRAWINGS

Embodiments of the invention are presented in the sense of examples and their advantages are explained in greater detail below, with reference to the accompanying drawings, wherein FIG. 1 schematically illustrates a circuit structure according to the prior art.

DETAILED DESCRIPTION OF EMBODIMENTS

It should be appreciated that, while this specification contains many specific implementation details, they should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Hereinafter, exemplary embodiments will be referred to in describing the mechanism and spirit of the present invention. It should be understood that these embodiments are merely provided to facilitate those skilled in the art in understanding and in turn implementing the present invention, but not for limiting the scope of the present invention in any way.

In a first aspect of embodiments of the present invention, there is provided a circuit structure for reducing power consumption in the redundant analog out module. Hereinafter, reference will be made to FIGS. 2 to 5 to describe the circuit structure according to the first aspect of the embodiments of the present invention.

Figure 2:
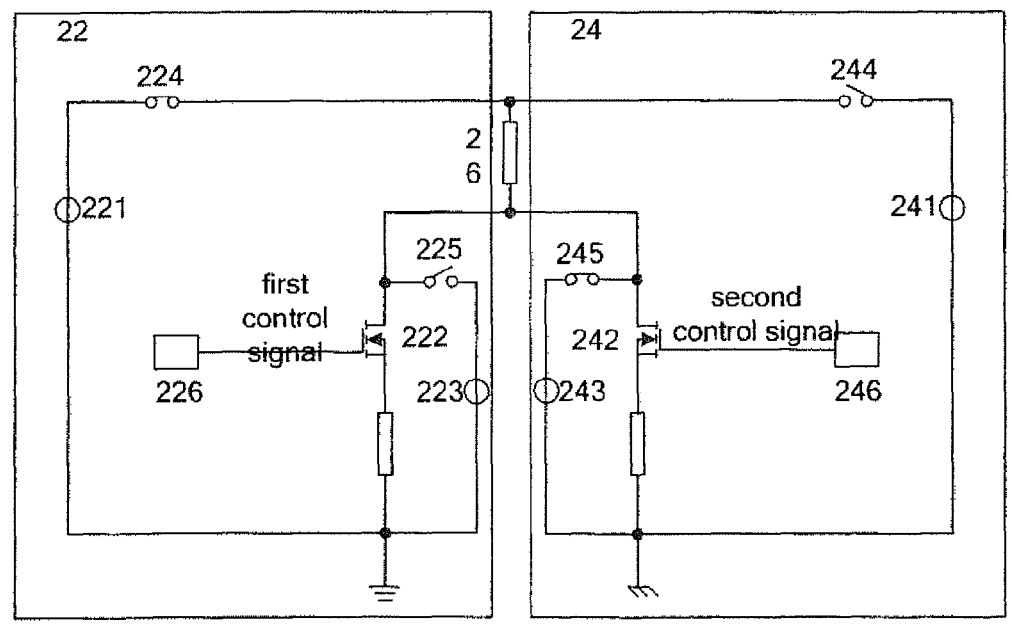
FIG. 2 schematically illustrates a circuit structure according to an embodiment of the first aspect of embodiments of the present invention.

FIG. 2 schematically illustrates a circuit structure according to an embodiment of the first aspect of embodiments of the present invention.

As shown in FIG. 2, a circuit structure according to the first embodiment comprises an active module 22 and a passive or backup module or 24. In the exemplary embodiments, the active module 22 can comprise a main output voltage 221, which is configured to power a load 26 via a first current control device 222 when the active module 22 is in the active state. When the active module 22 is in the active state, a current passing through the load 26 may be controlled by applying a control signal to a control terminal of the first current control device 222.

Further, as shown in FIG. 2, the passive module 24 comprises a main output voltage 241, which is configured to power the load 26 via a second current control device 242 when the active module 22 fails, for example, an error is happened in the active module 22. When the passive module 22 is in the active state, a current passing through the load 26 may be controlled by applying a control signal to a control terminal of the second current control device 242.

As a person skilled in the art can easily understand, "the active state" in the context of the specification means that the module is in an operating state in which the load is powered by the module, and "the backup state" means that the module is in a "sleeping" state in which the module is ready to and will power the load once the module in the "active" state fails.

Further, as shown in FIG. 2, the passive module 24 can further comprise an auxiliary output voltage 243. The auxiliary output voltage 243 can power the second current control device 242 when the passive module 24 is in a backup state so as to enable the second current control device 242 to be in the switching-on state. In this embodiment, when the passive module 24 is in a backup state, the second current control device 242 is powered by the auxiliary output voltage 243, instead of the main output voltage 241, to keep in the switching-on state. According to the embodiment of the present invention, since the second current control device 242 is always in the switching-on state even though the passive module 24 is in the backup state, it is possible to make a steady switchover between the active module 22 and the passive module 24 when the active module 22 fails.

Figure 1:
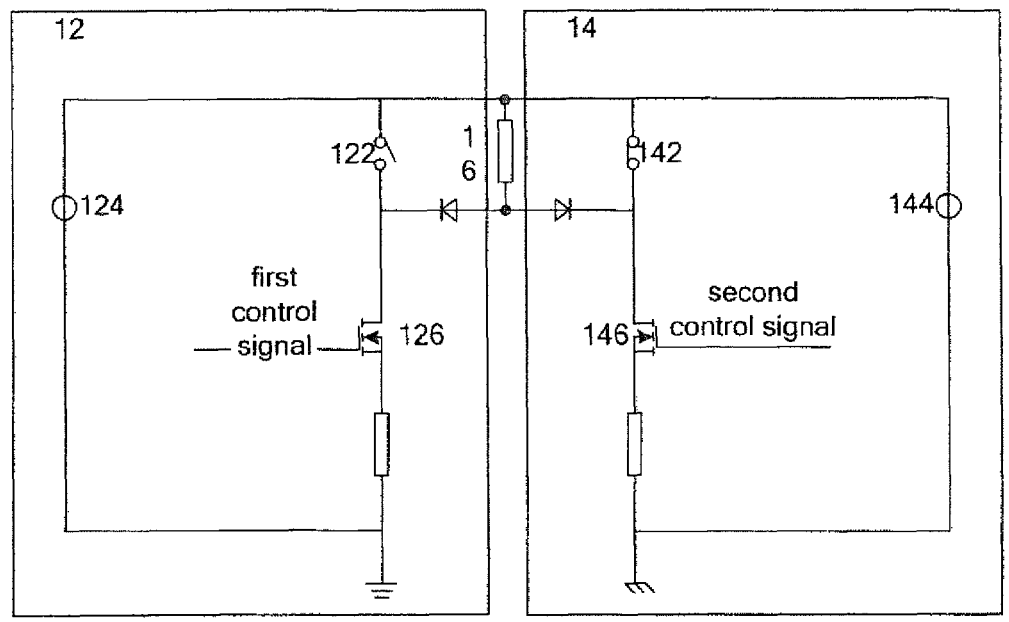

In addition, in this embodiment, the auxiliary output voltage 243 is configured to be smaller than the main output voltage 241 of the passive module 24. In the prior art solution as shown in FIG. 1, the main output voltage of the passive module is applied to the current control device of the passive module when the passive module is in the backup state. Since the main voltage of the passive module is relatively high, the power consumption of the passive module 24 quite high when it is the backup state, and not good for heat dissipation. In this embodiment of the present invention, the auxiliary output voltage 243 of the passive module 24 will power the second current control device 242 when the passive module 24 is a backup state, to enable the second current control device 242 to be in the switching-on state. Thus, the voltage applied to the second current control device 242 will be reduced from the main output voltage 241 to the auxiliary output voltage 243, thereby significantly lower power consumption of the passive module 24. Preferably, in this embodiment, the main output voltage 241 may be the auxiliary output voltage 243 three times.

In an exemplary embodiment of the present invention, as shown in FIG. 2, the active module 22 can also comprise an auxiliary output voltage 223. Similar to the auxiliary output voltage 243 of the passive module 24, the auxiliary output voltage 223 can power the first current control device 222 when the active module 22 is a backup state, to enable the first current control device 222 to be in the switching-on state. In this embodiment, when the active module 22 is in a backup state, the first current control device 222 is powered by the auxiliary output voltage 223, instead of the main output voltage 221, to keep in the switching-on state. Since the first current control device 222 is always in the switching-on state even though the active module 22 is in the backup state. Thus, it is possible to make a steady switchover between the active module 22 and the passive module 24 when the passive module 24 fails. In this embodiment, the auxiliary output voltage 223 is configured to be smaller than the main output voltage 221 of the active module. Thus, when the active module 22 is in the backup state, the output voltage from the active module 22 to the first current control device 242 will be reduced from the main output voltage 221 to the auxiliary output voltage 223, thereby significantly lower power consumption of the active module 22 and good for heat dissipation. Preferably, the main output voltage 221 is the auxiliary output voltage 223 three times.

In an exemplary embodiment of the present invention, as shown in FIG. 2, the active module 22 can comprise a first switch 224 between the main output voltage 221 and the first load 26 and a second switch 225 between the first current control device 222 and the auxiliary output voltage 223. In this embodiment, the first switch 224 and the second switch 225 are interlocked. Thus, it is possible to avoid both switch 224 and 225 being simultaneously opened or closed, so as to ensure that the main output voltage 221 and the auxiliary output voltage 223 do not operate at the same time.

In an exemplary embodiment of the present invention, as shown in FIG. 2, the passive module 24 can further comprise a third switch 244 between the main output voltage 241 and the first load 26 and a fourth switch 245 between the second current control device 242 and the auxiliary output voltage 243. In this embodiment, the third switch 244 and the fourth switch 245 are interlocked. Thus, it is possible to avoid both switch 244 and 245 being simultaneously opened or closed, so as to ensure that the main output voltage 241 and the auxiliary output voltage 243 of the passive module 24 do not operate at the same time.

In an exemplary embodiment of the present invention, as shown in FIG. 2, the first switch 224 of the active module 22 and the third switch 244 of the passive module 24 are interlocked. Thus, it is possible to ensure a steady switchover between the active module 22 and the passive module 24 and ensure that one of the active module 22 and the passive module 24 powers the first load 25.

In an exemplary embodiment of the present invention, as shown in FIG. 2, the active module 22 can comprise a first driving unit 226 connected to a control terminal of the first current control circuit 222, for providing a first control signal for periodically switching on and switching off the first current control circuit 222, thereby achieving current adjust passing the first load 26 when the active module is in the operating state.

Further, the passive module 24 can comprise a second driving unit 246 connected to a control terminal of the second current control circuit 242, for providing a second control signal for periodically switching on and switching off the second current control circuit 242, thereby achieving current adjust passing the first load 26 when the passive module 24 is in the operating state. Preferably, the first control signal is same as the second control signal.

In an exemplary embodiment of the present invention, as shown in FIG. 2, the first and second current control devices 222 and 242 are MOSFETs. However, it should be appreciated that the present invention is not limited to the illustrated and provided particular embodiment, but other types of transistors, e.g., a triode, may be applied to the present invention.

Figure 3:
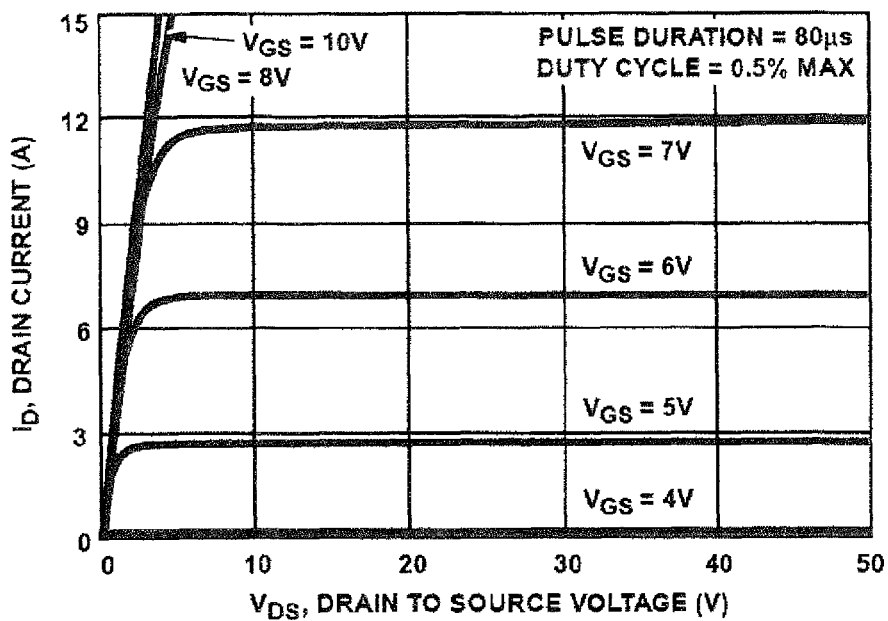
FIG. 3 schematically illustrates an output characteristics of the prior art MOSFET.

FIG. 3 schematically illustrates an output characteristic of the MOSFET. In FIG. 3, the horizontal axis represents a drain to source voltage $V_{DS}$ of the MOSFET, and the vertical axis represents a drain current of the MOSFET. As shown in FIG. 3, when the MOSFET is in its Saturation Region, the change of the voltage from drain to source, i.e., the output voltage of the active and passive modules 24 in FIG. 2, does not affect the change of the drain current of the MOSFET as long as $V_{GS}$ (a gate to source voltage of MOSFET) is fixed.

Thus, the auxiliary output voltage 223 can be further configured to be a voltage higher than or equal to a voltage for enabling the first current control device MOSFET 222 to be operate in its Saturation Region. The auxiliary output voltage 243 can be configured to be a voltage higher than or equal to a voltage for enabling the second current control device MOSFET 242 to be operate in its Saturation Region. In this case, the current passing the load 26 may be adjusted by a control signal applied to the control terminal of the first and second current control device (a gate of MOSFET).

In an exemplary embodiment of the present invention, if the first control signal to be applied to the first current control device 222 is same as the second control signal of the second current control device 242, the current passing the first current control device 222 and the current passing the first current control device 242 will be the same. Thus, a smooth handover of the active module 22 and the passive module 24 can be achieved.

Figure 4:
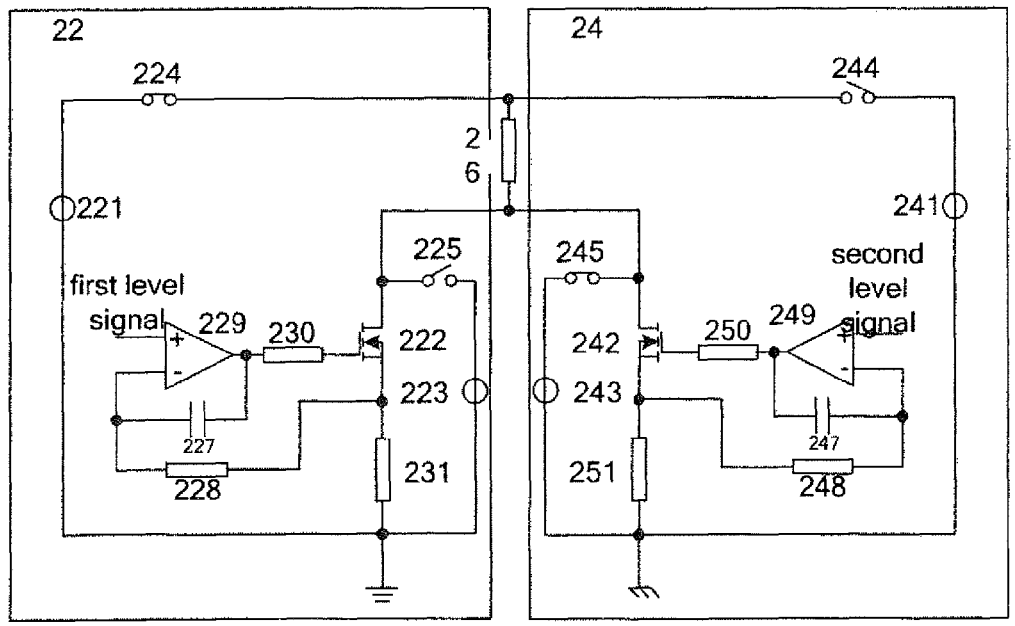
FIG. 4 schematically illustrates a circuit structure according to a further embodiment of the first aspect of embodiments of the present invention.

Referred to FIG. 4, the following gives an example of the driving unit which can be used in the embodiments of the present invention. FIG. 4 schematically illustrates a circuit structure according to a further embodiment of the first aspect of embodiments of the present invention.

The main differences between the embodiment of FIG. 2 and that of FIG. 4 are that FIG. 4 provides a detailed structure of the driving unit. The detailed description regarding the same elements is omitted for clarity.

As shown in FIG. 4, the first drive unit 226 shown in FIG. 2 can comprise a first resistance 230, a first capacity 227, a second resistance 228 and a first operational amplifier 229. A first terminal of the first resistance 230 is connected to the gate of the first MOSFET 222, and a second terminal of the first resistance 226 is connected to the first terminal of the first capacity 227. A second terminal of the first capacity 227 is connected to a first terminal of the second resistance 228. A second terminal of the second resistance 228 is connected to the source of the first MOSFET 222. A positive input of the first operational amplifier 229 is connected to the first level signal which equals to the product of the current passing through the load 26 and a first sample resistance 231, and a negative input of the first operational amplifier 229 is connected to the second terminal of the first capacity 227, and an output of the first operational amplifier 229 is connected to the first terminal of the first capacity 227.

As shown in FIG. 4, the second drive unit 246 shown in FIG. 2 can comprise a third resistance 250, a second capacity 247, a fourth resistance 248 and a second operational amplifier 249. A first terminal of the third resistance 250 is connected to a gate of the second MOSFET 242, and a second terminal of the third resistance 250 is connected to a first terminal of the second capacity 247. A second terminal of the second capacity 247 is connected to a first terminal of the fourth resistance 248, and a second terminal of the fourth resistance 248 is connected to a source of the second MOSFET 242. A positive input of the second operational amplifier 249 is connected to a second level signal which equals to the product of the current passing through the load 26 and a second sample resistance 251, a negative input of the second operational amplifier 249 is connected to the second terminal of the second capacity 247, and an output of the second operational amplifier 249 is connected to the first terminal of the second capacity 247.

It should be understood that the structure of the driving unit in FIG. 4 is schematic only, and other known structure in the art can also be applied to this invention.

Figure 5:
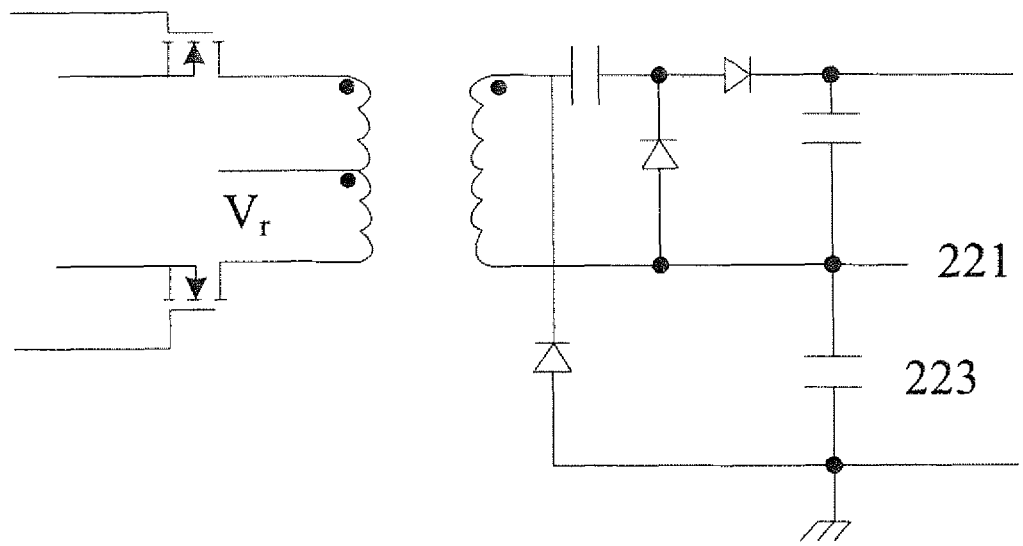
FIG. 5 schematically illustrates a plat transformer which may be used in the embodiments of the present invention.

FIG. 5 schematically illustrates a plat transformer which may be used to generate the main output voltage and the auxiliary output voltage of the passive module and the active module according to an embodiment of the present invention.

As shown in FIG. 5, the planar transformer generates the main output voltage 221 and the auxiliary output voltage 223 of the active module 22. Likewise, the planar transformer generates the main output voltage 241 and the auxiliary output voltage 243 of the passive module 24. The plat transformer structure of FIG. 5 is known in the art, and its detailed description is omitted therein for clarity.

The preferred embodiment describes a specific implementation of the output voltage generated by a planar transformer. However, it should be noted that the present invention is not limited to the illustrated and provided particular embodiments, but various modification, for example, output voltage provided by other types of transformer, may be made within the scope of the present invention.

In a second aspect of the embodiments of the present invention, there is also provided a circuit structure switchable between an operating state and a backup state. Hereinafter, reference will be made to FIG. 6 to describe the circuit structure according to the second aspect of the present invention.

Figure 6:
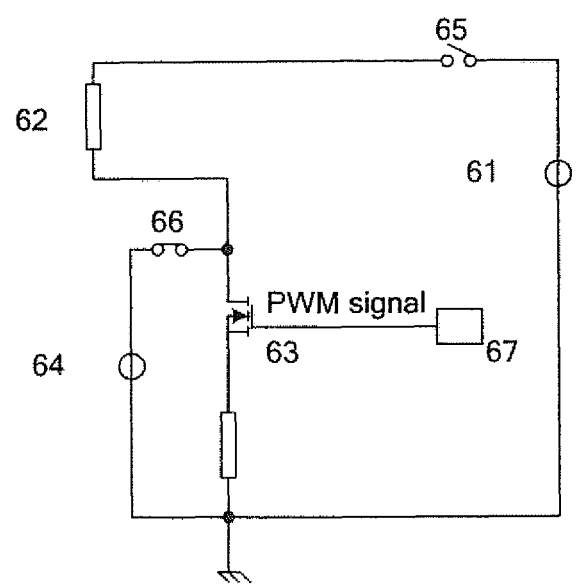
FIG. 6 schematically illustrates a circuit structure according to an embodiment of the second aspect of embodiments of the present invention.

FIG. 6 schematically illustrates a circuit structure switchable between an operating state and a backup state according to the second aspect of embodiments of the present invention. As shown in FIG. 6, the circuit structure comprises a main output voltage 61 for powering a load 62 via a current control device 63 when the circuit structure is in the operating state. The current control device 63 is configured to control a current passing through the load 62. The circuit structure further comprises an auxiliary output voltage 64 for powering the current control device 63 when the circuit structure is in the backup state, so as to enable the current control device 63 to be in the switching-on state. In this embodiment the auxiliary output voltage 64 is smaller than the main output voltage 61.

In an exemplary embodiment of the present invention, as shown in FIG. 6, the auxiliary output voltage 64 is further configured to provide the current control device 63 with a voltage higher than or equal to a voltage for enabling the second current control device 63 to be in its saturation region.

Further, as shown in FIG. 6, the circuit structure further comprises a first switch 65 between the main output voltage 61 and the load 62 and a second switch 66 between the current control device 63 and the auxiliary output voltage 64. In the embodiment, the first switch 65 and the second switch 66 are interlocked.

Further, as shown in FIG. 6, the current control device 63 is a MOSFET. It should be appreciated that other types of transistors may be applied to the present invention.

Further, the circuit structure shown in FIG. 6 can be an active module or a passive module.

The following will describe a method for reducing power consumption of a device including an active module 22 and a passive module 24 according to embodiments of the present invention in combination with the circuit structure of FIG. 2.

The method for reducing power consumption according to embodiments of the present invention comprises: powering a load 26 via a first current control device 222 by a main output voltage 221 of the active module 22. The first current control device 222 controls a current passing through the load 26.

Further, the method comprises: when the active module 22 fails, powering the load 26 via a second current control device 242 by a main output voltage 241 of a passive module 24. The second current control device 242 controls a current passing through the load 26.

Further, the method comprises: when the passive module 24 is in a backup state, powering the second current control device 242 by an auxiliary output voltage 243 of the passive module 24 so as to enable the second current control device 242 to be in a switching-on state. In this embodiment, the auxiliary output voltage 243 of the passive module 24 is smaller than the main output voltage 241 of the passive module 24. In an exemplary embodiment, the auxiliary output voltage 243 of the passive module 24 provides the second current control device 242 with a voltage greater than or equal to a voltage for enabling the second current control device 242 to be in its saturation region.

Further, the method may further comprise: when the active module 24 is in a backup state, powering the first current control device 222 by an auxiliary output voltage 223 of the active module 22, so as to enable the first current control device 222 to be in a switching-on state. The auxiliary output voltage 223 of the active module 22 is smaller than the main output voltage 221 of the active module 22. In an exemplary embodiment, the auxiliary output voltage 223 of the active module 22 is higher than or equal to a voltage for enabling the first current control device 222 to be in its saturation region.

In an exemplary embodiment, the active module 22 comprises a first switch 224 between the main output voltage 221 of the active module 22 and the load 26 and a second switch 225 between the first current control device 222 and the auxiliary output voltage (223) of the active module 22, wherein the first switch 224 and the second switch 225 are interlocked.

In an exemplary embodiment, the passive module 24 comprises a third switch 244 between the main output voltage 241 of the passive module 24 and the load 26 and a fourth switch 245 between the second current control device 242 and the auxiliary output voltage 243 of the passive module 24. Further, the third switch 244 and the fourth switch 245 are interlocked.

Further, in an exemplary embodiment, the first switch 224 and the third switch 244 are interlocked.

In an exemplary embodiment, the first current control device 222 and the second current control device 242 are MOSFETs.

By studying the drawings, the disclosure of the embodiments of the present invention, and the attached Claims, those skilled in the art may understand and implement other modifications of the disclosed embodiments during the implementation of the present invention. In the claims, "comprising" does not exclude other elements or steps, and "a" or "one" does not exclude the plural concept. The simple fact of illustrating specific elements in the dependent claims, which are mutually different from each other, does not indicate that the combination of these elements cannot be used advantageously. The labels in drawings of the claims should not be interpreted as limiting the scopes thereof.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A circuit structure, comprising:
   an active module comprising a main output voltage for powering a load via a first current control device which is configured to control a current passing through the load; and
   a passive module comprising a main output voltage when the active module fails, powering the load via a second current control device which is configured to control a current passing through the load,
   wherein the passive module further comprises an auxiliary output voltage for when the passive module is in a backup state, powering the second current control device so as to enable the second current control device to be in a switching-on state, and wherein the auxiliary output voltage of the passive module is configured to be smaller than the main output voltage of the passive module.

2. The circuit structure according to claim 1, wherein,
   the auxiliary output voltage of the passive module is further configured to provide the second current control device with a voltage greater than or equal to a voltage for enabling the second current control device to be in its saturation region.

3. The circuit structure according to claim 1, wherein the active module further comprises: an auxiliary output voltage for powering the first current control device when the active module is in a backup state, to enable the first current control device to be in a switching-on state; and
  wherein the auxiliary output voltage of the active module is configured to be smaller than the main output voltage of the active module.

4. The circuit structure according to claim 3, wherein the auxiliary output voltage of the active module is further configured to be greater than or equal to a voltage for enabling the first current control device to be in its saturation region.

5. The circuit structure according to claim 3, wherein the active module further comprises; a first switch between the main output voltage of the active module and the load; and a second switch between the first current control device and the auxiliary output voltage of the active module; wherein the first switch and the second switch are interlocked.

6. The circuit structure according to claim 5, wherein the passive module further comprises:
  a third switch between the main output voltage of the passive module and the load; and
  a fourth switch between the second current control device and the auxiliary output voltage of the passive module;
  wherein the third switch and the fourth switch are interlocked.

7. The circuit structure according to claim 6, wherein the first switch and the third switch are interlocked.

8. The circuit structure according to claim 1, wherein the active module further comprises a first driving unit connected to a control terminal of the first current control device for providing a first control signal for periodically switching on and switching off the first current control device; and
  the passive module further comprises a second driving unit connected to a control terminal of the second current control device for providing a second control signal for periodically switching on and switching off the second current control device.

9. The circuit structure according to claim 8, wherein the first control signal is same as the second control signal.

10. The circuit structure according to claim 1, wherein the first current control device and the second current control device are MOSFETs.

11. The circuit structure according to claim 3, further comprising:
  a first planar transformer for generating the main output voltage and the auxiliary output voltage of the active module.

12. The circuit structure according to claim 1, further comprising:
  a second planar transformer for generating the main output voltage and the auxiliary output voltage of the passive module.

13. A circuit structure switchable between an operating state and a backup state, comprising:
  a main output voltage for powering a load via a current control device which is configured to control a current passing through the load when the circuit structure is in the operating state; and
  an auxiliary output voltage for when said circuit structure is in the backup state, powering the current control device so as to enable the current control device to be in a switching-on state;
  wherein the auxiliary output voltage is configured to be smaller than the main output voltage.

14. The circuit structure according to claim 13, wherein the auxiliary output voltage further configured to provide the current control device with a voltage greater than or equal to a voltage for enabling the current control device to be in its saturation region.

15. The circuit structure according to claim 13, further comprising:
  a first switch between the main output voltage and the load; and
  a second switch between the current control device and the auxiliary output voltage; wherein the first switch and the second switch are interlocked.

16. The circuit structure according to claim 13, wherein the current control device is a MOSFET.

17. A method for reducing power consumption of a device including an active module and a passive module, comprising:
  powering a load via a first current control device by a main output voltage) of the active module, wherein the first current control device controls a current passing through the load;
  when the active module fails, powering the load via a second current control device by a main output voltage of the passive module, wherein the second current control device controls a current passing through the load; and
  when the passive module is in a backup state, powering the second current control device by an auxiliary output voltage of the passive module so as to enable the second current control device to be in a switching-on state;
  wherein the auxiliary output voltage of the passive module is smaller than the main output voltage of the passive module.

18. The method according to claim 17, wherein; the auxiliary output voltage of the passive module provides the second current control device with a voltage greater than or equal to a voltage for enabling the second current control device to be in its saturation region.

19. The method according to claim 17, further comprising:
  when the active module is in a backup state, powering the first current control device by an auxiliary output voltage of the active module, so as to enable the first current control device to be in a switching-on state;
  wherein the auxiliary output voltage of the active module is smaller than the main output voltage of the active module.

20. The method according to claim 19, wherein,
  the auxiliary output voltage of the active module is greater than or equal to a voltage for enabling the first current control device to be in its saturation region.

21. The method according to claim 19, wherein the active module comprises:
  a first switch between the main output voltage of the active module and the load; and
  a second switch between the first current control device and the auxiliary output voltage the active module;
  wherein the first switch and the second switch are interlocked.

22. The method according to claim 21, wherein the passive module comprises:
  a third switch between the main output voltage of the passive module and the load; and
  a fourth switch between the second current control device and the auxiliary output voltage of the passive module;

wherein the third switch and the fourth switch are interlocked.

23. The method according to claim 22, wherein the first switch and the third switch are interlocked.

24. The method according to claim 17, wherein the first current control device and the second current control device are MOSFETs.

* * * * *